May 8, 1951          E. M. SPLAINE          2,552,122
OPHTHALMIC MOUNTING
Filed July 22, 1946
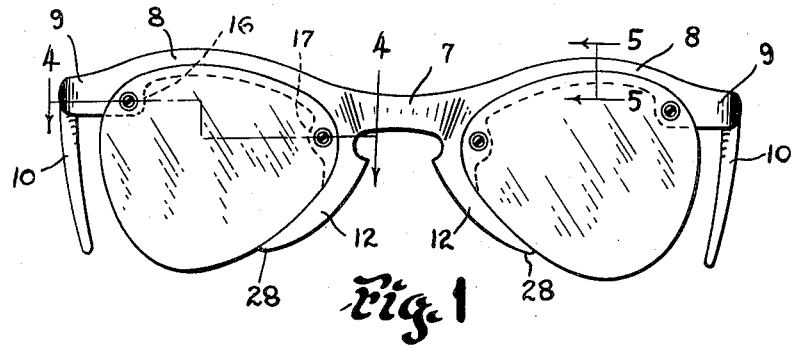
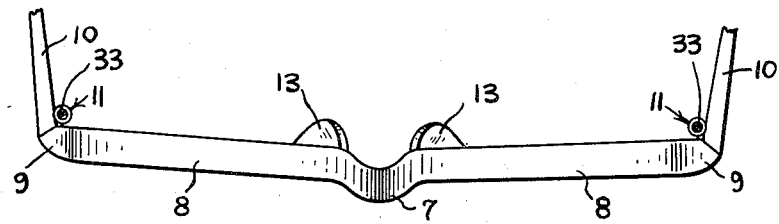
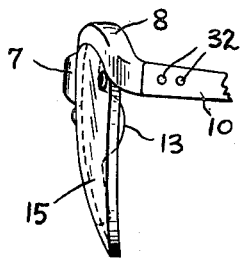
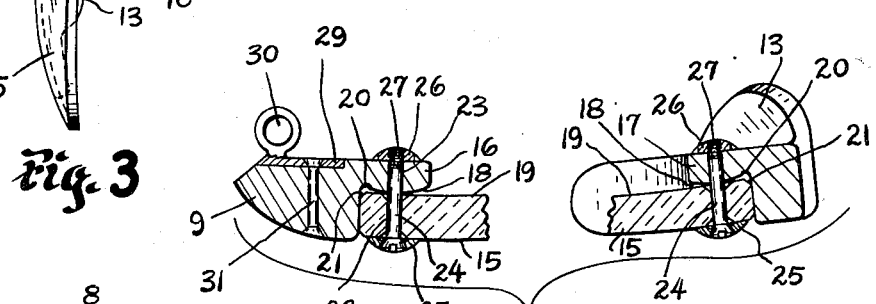
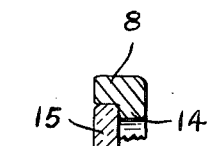
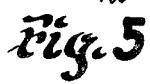
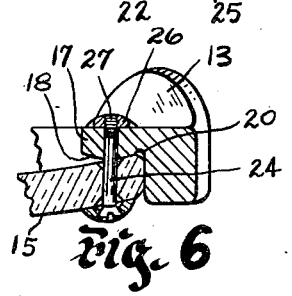
INVENTOR
EDWARD M. SPLAINE
BY
*Louis L. Gagnon*
ATTORNEY Patented May 8, 1951

2,552,122

UNITED STATES PATENT OFFICE 2,552,122

OPHTHALMIC MOUNTING

Edward M. Splaine, Southbridge, Mass., assignor to American Optical Company, Southbridge, Mass., a voluntary association of Massachusetts Application July 22, 1946, Serial No. 685,511

3 Claims. (Cl. 88—41)

This invention relates to ophthalmic mountings and more particularly to half-rim type mountings formed of non-metallic material.

One of the principal objects of the invention is to provide a half-rim type mounting embodying an integral bridge, long and slender temple supporting rim portions extending outwardly of the opposed sides of the bridge and shaped to follow substantially the upper contour shape of the lenses and having relatively short rim portions depending from the sides of the bridge in combination with integral means for attaching the mounting to the lenses whereby the mounting is readily adaptable for connection with lenses of different curvatures.

Another object is to provide a mounting of the above character with integral lens connection means having their lens engaging surfaces shaped to a curve whose radius is less than the curvature of the engaging surfaces of the lenses to be used with the mounting.

Another object is to provide a half-rim type mounting of the above character with integral lens connection means which are recessed adjacent the inner ends thereof for clearance with the adjacent contour edges of the lenses whereby lenses of different curvature may be readily connected to said lens connection means.

Another object is to provide temple supporting half-rim portions with a reinforcing lip shaped to lie in the rear of the lens and for increasing the width of the rims in the direction of the plane of the lenses.

Another object is to provide a mounting of the above character having lens connection means on the nasal and temporal sides thereof.

Other objects and advantages of the invention will become apparent from the following description taken in connection with the accompanying drawings and it will be apparent that many changes may be made in the details of construction and arrangement of parts shown and described without departing from the invention as expressed in the accompanying claims. I, therefore, do not wish to be limited to the exact details of construction and arrangement of parts shown and described as the preferred form only has been given by way of illustration.

Referring to the drawing:

Fig. 1 is a front elevational view of the mounting embodying the invention;

Fig. 2 is a top plan view thereof;

Fig. 3 is a fragmentary side view thereof;

Fig. 4 illustrates enlarged fragmentary sectional views taken as on line 4—4 through a nasal and one temporal side of the mounting;

Fig. 5 is an enlarged fragmentary sectional view taken as on line 5—5 of Fig. 1; and Fig. 6 is an enlarged fragmentary view showing the relation of a lens of increased curvature over that of the lens illustrated in Fig. 4 and its relation with the lens engaging surface of the integral lens connection means.

Referring to the drawings wherein like characters of reference designate like parts throughout the several views, the mounting embodying the invention is preferably formed of a non-metallic material such as cellulose acetate, cellulose nitrate, methyl methacrylate or any other known artificial plastic or resinous material and comprises a bridge member 7 having integral arm or rim portions 8 extending outwardly of the opposed sides thereof and shaped to follow substantially the upper contour shape of the lenses and terminating in temple connection ends 9 to which temples 10 are pivotally connected as illustrated at 11.

Depending from the opposed sides of the bridge member 7 there are relatively short rim sections 12 having integrally related rearwardly extending nose bearing pads 13 thereon. The rim portions 8, in order to increase the rigidity thereof, are provided with integral depending lips 14 extending throughout the length thereof and which simultaneously function as backing supports for the upper contour edges of the lenses 15 used with said rims. The said rim portions 8 adjacent the nasal and temporal edges thereof are provided with integral strap portions 16 and 17, see Figs. 1 and 4, each formed with a front surface 18 of a radius of curvature which is less than the radius of curvature of the engaging surfaces 19 of the lenses 15. Each of the lens straps 16 and 17 is recessed at 20 to provide a clearance for the adjacent edges 21 of the lenses whereby lenses of different curvature may be readily assembled with the strap portions. The lenses are provided with openings 22 aligned with openings 23 formed in the respective lens strap portions 16 and 17 and adapted to receive connection screws 24. The screws 24 extend through cupped washers 25 overlying the front surfaces of the lenses and straddling the connection openings therein and are provided inwardly with nuts 26 threadedly connected with the threaded ends 27 of the screws. As illustrated in Figs. 4 and 6 lenses of different curvature may be readily fitted on the front surfaces 18 of the strap portions and may be held thereon by means of the connection screws 24. In Fig. 4 a relatively shallow curved lens is illustrated and in Fig. 6 a relatively steep curved lens is illustrated. The recessed portions 20 provide clearance for the adjacent edges of the lenses whereby they may be readily seated on the front curved surfaces of the lens straps. The depending relatively short rim portions 12 are shaped substantially to the nasal contour shapes of the lenses and to have a relatively intimate fit therewith and the distance between the free ends 28 of said rim portions and the temple supporting ends 9 of the rim portions 8 are such as to aid in retaining the lens in relatively intimate fit with the mounting. The distance between the said ends 28 and the inner lens engaging surfaces of the temple supporting ends 9 may be formed slightly less than the diameter of the lens along a line intersecting said ends 28 and rim ends 9 whereby the said ends 28 will be required to be sprung slightly outwardly when the lenses are being assembled with the rims. This aids in retaining the lenses in intimate fitted relation with the mounting. The distance between the free ends 28 and the inner surfaces of the temple supports in any event is less than the greatest diameter of the lenses in said direction.

It is particularly pointed out that the width of the rim portions 8 is greater than the thickness of the lenses and that the said rims are adapted to overlie the edge of the lenses with the depending portions 14 lying in the rear of the lenses. The pivot means 11 are in the form of hinge ears 29 having perforated hinge pintles thereon and secured to the endpieces 9 and adjacent ends of the temples 10 by means of pins or the like 31 and 32. The said hinge pintles 30 are pivotally connected by means of a screw or the like 33, see Fig. 2.

If desired the depending portions 14 may be omitted from the rim sections 8, particularly in instances when the thickness of the rims, as compared with the thickness of the lenses, provides sufficient rigidity to prevent the mounting from distorting from the shape to which it is initially fabricated. It is also pointed out that the rim portions 8 are provided with a continuous inner surface blending with an inner surface formed on the respective rim portions 12 and which are shaped to the adjacent contour shape of the lenses.

If desired the openings in the integral lens strap portions 16 and 17 may be threaded to receive the connection screws 24, it being preferable, however, to provide suitable threaded nuts 26 for receiving the threaded ends 27 of the screws.

The cupped washers 25 are so related with the adjacent ends of the screws 24 as to permit the said washers to readily tilt to the angle of the front surfaces of the lenses and to permit the said washers to seat themselves with the lenses about the connection openings therein.

From the foregoing description it will be seen that simple, efficient and economical means have been provided for accomplishing all of the objects and advantages of the invention, particularly for providing a non-strain introducing bearing surface on the lens holding means and which will have substantially the same bearing fit with lenses of differently curved shapes and which will relieve strain on the edges of the lenses.

Having described my invention, I claim:

1. A lens supporting structure for the lenses of an ophthalmic mounting, said structure comprising a relatively rigid central bridge section having integrally related depending nasal portions and having its upper and side edges tapering outwardly and convergingly into relatively long and slender bar-like portions, with said bridge section being of a width greater than twice the width of the front exposed surface portion of said bar-like portions, the long and slender bar-like portions each terminating in an integrally related enlarged temple connection end portion of a width greater than twice the width of said front exposed surface portion of said bar-like portions, said depending nasal portions tapering downwardly and outwardly to relatively pointed end portions whereby the exposed surfaces of said depending portions are in downwardly and outwardly diverging relation with each other, said depending portions, long and slender bar-like portions and enlarged temple end portion thereof having a continuous inner surface pre-shaped to overlie the adjacent contour edge portion of a lens to be fitted therewith, said surface intersecting the lower surface of the temple end portions at an obtuse angle, and an integral lip extending from said depending nasal portions and throughout the length of the long and slender bar-like portions into the inner ends of the enlarged temple end portions, said lip being adapted to overlie an adjacent side surface of the lenses to be fitted therewith, said lip having integral enlarged perforated ear-like portions adjacent each of the depending nasal portions and adjacent the enlarged temporal end portions, said ear-like portions each having a protuberant portion of non-metallic material with a convexly shaped lens surface engaging face, the perforation in said ear-like portions substantially intersecting the vertex of said convexly shaped face of the protuberant portion thereof, and with the radius of curvature of said lens surface engaging face being less than the radius of curvature of the lens to be assembled therewith so as to have tangential contact with the surface of said lens substantially adjacent its connection therewith whereby lenses of different curved shapes may be connected to the ear-like portions without the exertion of twisting strain on said portions.

2. An ophthalmic mounting comprising a pair of lenses having nasal and temporal connection openings and a supporting structure therefor, said structure comprising a relatively rigid central bridge section having integrally related depending nasal portions and having its upper and side edges tapering outwardly and convergingly into relatively long and slender bar-like portions, with said bridge section being of a width greater than twice the width of the front exposed surface portion of said bar-like portions, the long and slender bar-like portions each terminating in an integrally related enlarged temple connection end portion of a width greater than twice the width of said front exposed surface portion of said bar-like portions, said depending nasal portions tapering downwardly and outwardly to relatively pointed end portions whereby the exposed surfaces of said depending portions are in downwardly and outwardly diverging relation with each other, said depending portions, long and slender bar-like portions and enlarged temple end portions thereof having a continuous inner surface overlying the adjacent contour edge portion of a respective lens, and said surface intersecting the lower surface of the temple end portions at an obtuse angle, an integral lip extending from said depending nasal portions and throughout the length of the long and slender bar-like portions into the inner ends of the enlarged temple end portions, said lip overlying an adjacent side surface of the lenses fitted therewith, said lip having integral enlarged perforated ear-like portions adjacent each of the depending nasal portions and adjacent the enlarged temporal end portions, and said ear-like portions each having a protuberant portion of non-metallic material on their inner side with a convexly shaped lens surface engaging face of a radius of curvature less than the radius of curvature of the adjacent surface of the lenses, the perforation in each of said ear-like portions substantially intersecting the vertex of said convexly shaped face of the protuberant portion thereof and each being aligned with a respective connection opening in said lenses, and connection means extending through said aligned connection openings and perforations for securing the lenses to the ear-like portions, said protuberant portion having tangential contact with the adjacent surface of said lenses substantially adjacent their connection therewith.

3. In an ophthalmic mounting a lens supporting structure comprising a central bridge portion, a pair of bar-like portions extending outwardly from the opposed sides of said bridge, and temple connection means adjacent the temporal end of the bar-like members, said bar-like members each having an integral relatively thin depending lip extending throughout the major portion of its length intermediate the bridge and said temporal end thereof, said bar-like portions being shaped substantially to and adapted to overlie the adjacent upper edges of the lenses, with the integral lips thereof overlying an adjacent side surface of said lenses when fitted therewith, and a pair of spaced perforated lens connection ear portions formed integrally with said lips and extending inwardly therefrom to overlie an adjacent surface portion of the lens, said lens connection ear portions each having a protuberant portion with a convexly shaped lens surface engaging face, the perforation in said ear portions substantially intersecting the vertex of said convexly shaped face of the protuberant portion, and with the radius of curvature of said lens surface engaging face being less than the radius of curvature of the lens to be assembled therewith so as to have tangential contact with the surface of said lens substantially adjacent its connection therewith.

EDWARD M. SPLAINE.

REFERENCES CITED

The following references are of record in the file of this patent:

UNITED STATES PATENTS

| Number | Name | Date |
|---|---|---|
| 572,107 | Essick | Dec. 1, 1896 |
| 1,176,694 | Wells | Mar. 21, 1916 |
| 1,264,888 | Brown | May 7, 1918 |
| 2,372,059 | Cook | Mar. 20, 1945 |
| 2,384,815 | Cozzens | Sept. 18, 1945 |
| 2,389,742 | Rey | Nov. 27, 1945 |
| 2,452,159 | Small | Oct. 26, 1948 |